Oct. 19, 1926.　　　　　　　　　　　　　　　　1,603,270
G. G. CHILDS
SPRAY NOZZLE
Filed Nov. 9, 1923
Fig. 1.
Fig. 2.
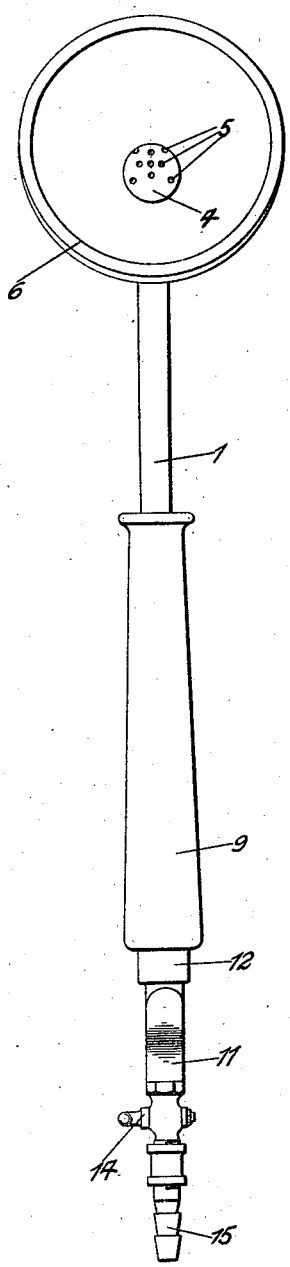
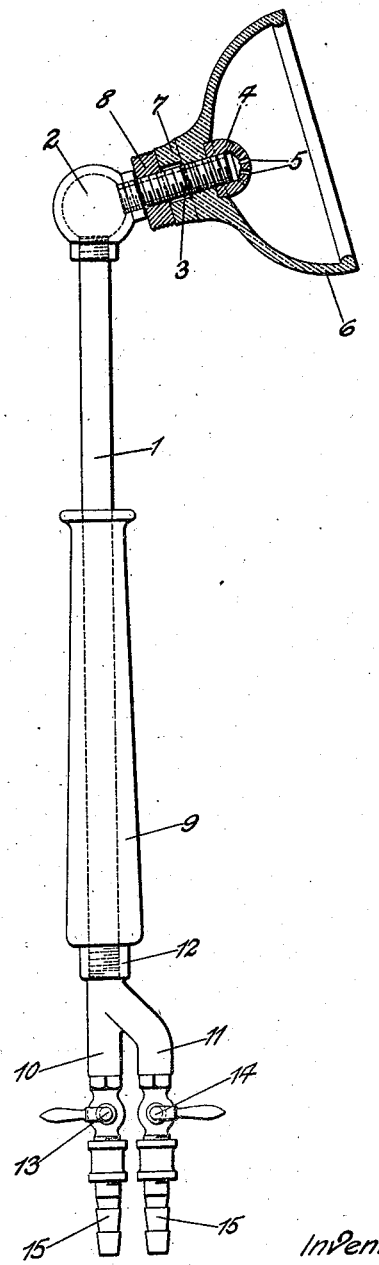
Inventor:
Gustav G. Childs,
His Attorneys.

Patented Oct. 19, 1926.

1,603,270

UNITED STATES PATENT OFFICE.

GUSTAV G. CHILDS, OF ST. LOUIS, MISSOURI, ASSIGNOR TO BRECK ENGINEERING COMPANY, OF ST. LOUIS, MISSOURI, A CORPORATION OF MISSOURI.

SPRAY NOZZLE.

Application filed November 9, 1923. Serial No. 673,676.

This invention relates to improvements in spray nozzles.

An object of the invention is to provide an improved spray nozzle including a spray head for receiving water from a pipe, an air inlet in direct communication with the pipe, a water inlet opening into the pipe at an angle to the air inlet, and means for conveniently varying the relative amounts of air and water passing into the pipe.

Another object of the invention is to provide an improved spray nozzle embodying the construction mentioned and designed and adapted for use in spraying polished surfaces, and including means for confining the spray to restricted areas of the surfaces to which it is directed.

Another object of the invention is to provide a device of the character mentioned having a relatively rigid handle portion of sufficient length to permit the spray to be directed to all points of relatively large surfaces conveniently and without the necessity of frequent change of position by the operator.

Other objects will appear from the following description, reference being made to the drawing in which Fig. 1 is an elevation of my improved spray nozzle.

Fig. 2 is a side elevation with parts shown in section.

In the embodiment of the invention shown the pipe 1 has one arm of a hollow globular elbow 2 attached to one end thereof. An exteriorly threaded section of pipe 3 is attached to the other arm of the elbow 2. A substantially semi-spherical spray head 4 is attached to the end of the pipe 3 and is provided with a sufficient number of outwardly diverging holes 5 for the emission of the spray. The parts are detachable one from the other, so that they may be disassembled for any desired purpose.

A relatively large elastic cup 6 of rubber or similar non-abrasive elastic material encloses the spray head 4 and confines the spray to an area about the size of the inside of the cup. The bottom of the cup has a thickened part 7 provided with a hole through which the pipe 3 extends. A nut 8 is screwed on the pipe 3 and constitutes means for clamping the cup against the nozzle so that when in use the parts are held in proper assembly.

As the pipe 1 is relatively small it is preferably provided with an enlarged handle 9 of aluminum or other light material.

The air and water inlet device may be in the form shown comprising a tubular part 10 and a branch tubular part 11 united with an enlargement 12 into which the end of the pipe 1 screws. The tubular part 10 is provided with a valve 13, and the tubular part 11 is provided with a similar valve 14, said valves being adjacently disposed so that they may be readily manipulated by the same hand to control and vary relatively the amounts of air and water passing therethrough for discharge through the nozzle. Each of the tubes 10 and 11 is provided with appropriate portions 15, one for connection with the air hose and the other for connection with a water hose.

It is preferable to admit air under pressure through the tube 11 and water through the tube 10, the air entering the line at an angle so that the air will break up the water and discharge it through the holes 5 in the form of a fine spray, the fineness of which may be varied as desired by varying the relative amounts of water and air. The relationship of the parts to obtain this result is an important feature of the present invention for in using the device to wash highly polished surfaces, such as the surfaces of automobiles, it is desirable to avoid scratching such surfaces. This may be avoided by manipulating the valves 13 and 14 to discharge relatively small quantities of water in the form of a fine spray; while in washing surfaces where a high degree of care is not required a greater volume of water may be admitted and discharged in the form of jets. The fine spray discharged through the nozzle and confined by the cup 6 dissolves the dirt and removes it without marring the polished surfaces, such action being gently and slowly effective.

The action of the spray is due to the outwardly diverging holes in the spray head, the holes being arranged radially so that a rotary or whirling action of the several jets meet the surface being washed at an oblique angle, thus avoiding the driving of the grit and dirt into the polished surface, but removing it by a whirling motion. The device, therefore, has a considerable advantage in use for cleaning polished surfaces, such as highly finished automobile bodies and the like.

The device may be made of any desired length for convenient manipulation over the surface and even over the top of an automobile, so that it is unnecessary for the operator to lean upon or otherwise place his weight upon the top of the vehicle as by so doing it has often occurred that the top has been broken or bent. This undesirable result may be avoided by the present device which also makes it unnecessary for the operator to rub the polished surface. If desired the edge of the cup may be used for the purpose of gently rubbing the surface after the dirt has been dissolved and washed away by the spray.

I am aware that the device may be varied as to its construction and otherwise without departure from the nature and principle of the invention, and I do not restrict myself unessentially in these or other particulars, but what I claim and desire to secure by Letters Patent is:—

A spray nozzle adapted for use in washing polished surfaces of automobiles and the like, comprising an elongated pipe section for supplying the cleaning fluid, a discharge nozzle set at an angle in respect to said pipe section, a semi-spherical head for the nozzle having a plurality of spray openings therethrough, said openings diverging outwardly in a radial direction in respect to said nozzle head, an elastic cup device having a concave inner surface, the walls of which extend substantially beyond the head of the spray nozzle, and means for admitting air and cleaning fluid to said elongated pipe section.

GUSTAV G. CHILDS.